Patented Oct. 30, 1928.

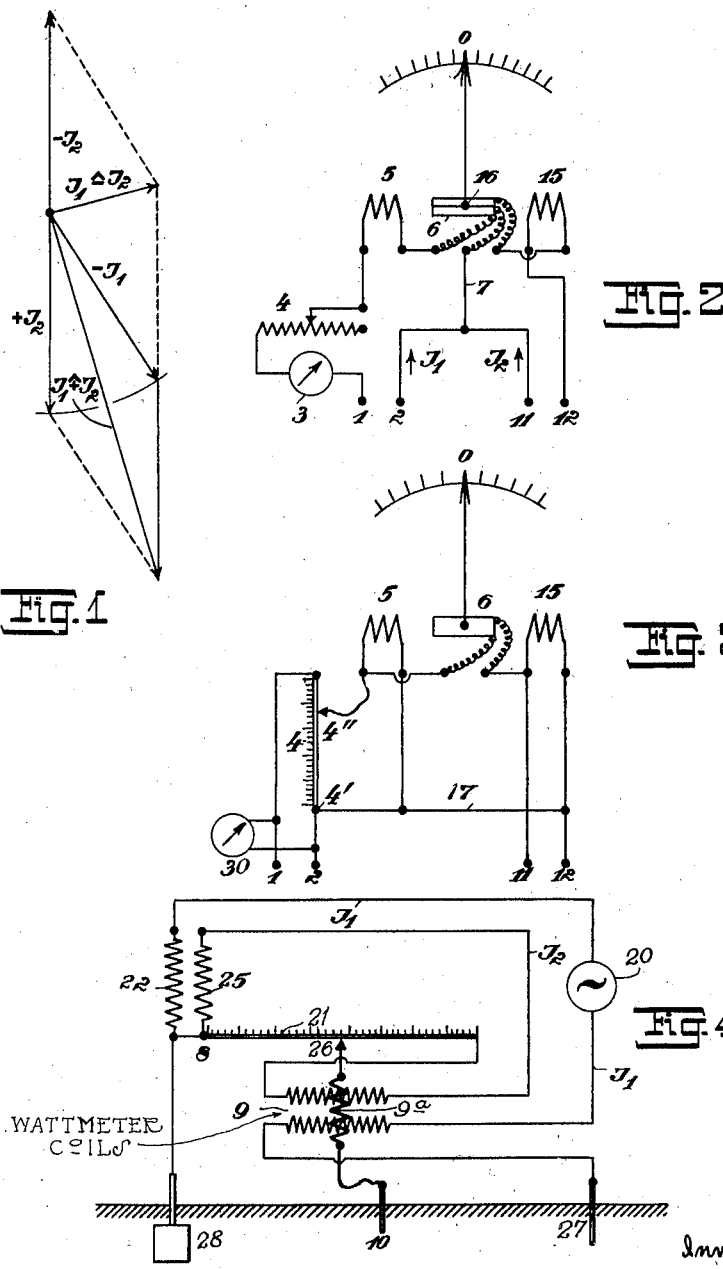

1,689,660

UNITED STATES PATENT OFFICE.

DIETER ALBRECHT, OF BERLIN, GERMANY, ASSIGNOR TO SIEMENS & HALSKE, AKTIEN-GESELLSCHAFT, OF SIEMENSSTADT, NEAR BERLIN, GERMANY, A CORPORATION OF GERMANY.

METHOD AND ARRANGEMENT FOR COMPARATIVE ALTERNATING-CURRENT MEASUREMENTS.

Application filed January 29, 1925, Serial No. 5,541, and in Germany February 2, 1924.

In the customary methods heretofore used for measuring direct currents and voltages by so-called zero methods, the value to be measured, for instance the voltage, is compared with a known variable value of the same character, the indicating instrument being connected by suitable circuits in such manner that it registers zero when the two values to be compared are equal. Examples of such methods are the so-called potentiometer method and Wheatstone's bridge. In the former method for instance the known voltage is varied by means of an adjustable known resistance until it becomes equal to the unknown voltage. The equality of the two voltages is ascertained by the zero indication of a galvanometer connected in series with the unknown voltage and connected to the terminals of the known adjusted resistance portion. The circuit arrangements are in these arrangements such that the voltage at the terminals of the adjusted known resistance portion opposes the unknown voltage.

If in similar manner two equal alternating current voltages are arranged in opposition to each other according to the aforementioned potentiometer method ordinarily no zero indication will appear in the branch circuit which contains unknown electromotive forces, even if the two voltages should be exactly of the same value. In order to obtain zero indication it is necessary that the two voltages are not only equal in value but also in phase. Thus if the methods common for direct current measurements should be used for measuring alternating currents or voltages, it is first necessary to adjust the two values to be compared to the same phase. This would ordinarily require, in contradistinction to a single adjustment in case of direct current measurements, two adjustments for each observation. By the special apparatus necessary to shift and equalize the phases the entire measuring method becomes complicated and cumbersome.

It is the purpose of the present invention to render possible the use of comparative measuring methods used in direct current methods for comparing alternating current values, without the necessity of additional phase shifting apparatus, so that only one adjustment is necessary the same as in direct current measurements.

To attain this purpose according to the present invention I propose to use an indicating instrument of the so-called wattmeter type or dynamometer type in which the product of two current values, multiplied by the cosine of the relative phase angle of the two values is directly indicated. The indicating instrument is hereby connected in circuit in such manner that in one of its windings a current value becomes effective which is equal to the vector sum consisting of the unknown current value and of an adjustable known current value, whereas in the other winding of the instrument the vector difference of the previously mentioned current values is effective. By unknown current values I mean currents which are the result of or depend upon the value to be measured, such as the current proper or the voltage or the resistance.

I have illustrated in the accompanying drawings several methods arranged according to the present invention.

In these drawings—

Figure 1 represents a vector diagram portraying the phase shifted currents $J_1$ and $J_2$;

Figure 2 represents a wiring diagram for comparing an unknown alternating current with a known alternating current;

Figure 3 represents a wiring diagram similar to Figure 2 by which an unknown alternating current voltage is to be compared with a known voltage, and Figure 4 represents a diagram of an arrangement for comparing resistances.

Referring to Figure 2 the arrangement proposes to measure a current $J_2$ by means of an indicating instrument of the so-called wattmeter type. Instruments of this character are well known in the art and the present arrangement represents a typical form of this instrument. It consists of the stationary coils 5 and 15 and a movable pair of coils 6 suspended at 16 in a well known manner, an indicating hand denoted by the arrow being attached to the coils and playing over a scale. In the wiring diagram according to Figure 2 one of the two fixed field coils (15) is traversed by the unknown current $J_2$ and the other of the two field coils (5) is traversed by the known current $J_1$. The known current is supplied to the binding posts 1, 2 and can be controlled by means of the adjustable resistance 4 and its value can be read on the ammeter 3. Thus the effect of the two current values so far as the field produced by them is concerned is vectorially added. The effect in other words is the same as if a single field winding were traversed by the sum of the known and unknown current. Of course this sum of effects could also be produced with well known means, for instance by connecting the two currents individually into the primary windings of two transformers and by then connecting the secondary windings of these transformers in parallel with each other. Assuming the transformation ratio of these transformers as 1:1 the sum of the currents is obtained in the two parallel secondary windings. Such an arrangement however—entirely aside from the undesirable increase in the number of measuring appliances—introduces thru the transformers additional errors in the measurements. For this reason it is preferable to produce the vector sum of the two currents in the manner shown in Figure 2 by supplying the currents to the two field coils 5 and 15 so that their effects both act in the same sense and are thereby added.

The portions of movable coil 6 are connected in such manner that the vector difference between the currents $J_1$ and $J_2$ manifests itself as a result. Also in this case it should be avoided to produce this difference by means of transformers. Accordingly the movable coil pair 6 consists of two equal halves of which one (the lower one in Figure 2) is traversed by the known current $J_1$ which flows through field coil 5 and the upper half of coil 6 is traversed by the unknown current which flows through field coil 15. Whereas the two field coils 5 and 15 are connected such that the effects produced by the current which traverses them are vectorially added, the two halves of coil 6 are connected in circuit relatively to each other such that the two currents traversing the two halves oppose each other in their effect. The result of this arrangement is the same as if only one coil 6 existed the effect of which is equal to the resultant vector difference between currents $J_1$ and $J_2$.

In Figure 1 of the drawings the above described occurrences are graphically illustrated. This figure is intended to demonstrate that at equal magnitude of $J_1$ and $J_2$ the wattmeter instrument does not give any indication at any phase difference which might exist between these values. In order to prove this allegation, $J_1$, $J_2$ are assumed to represent for instance current values and are shown in the diagram of equal magnitude which is denoted by the arc connecting the two arrow points. The designation of the direction of the vectors by plus and minus is of course chosen at random and only serves to indicate that when the two values are assembled in the diagram the direction of one is to be opposite the direction of the other irrespective of which of the two has the plus and which has the minus sign. From this diagram it clearly appears that when the values $J_1$ and $J_2$ are equal the two resultant vectors one of which represents the resultant sum of $J_1+J_2$ and the other of which represents the difference $J_1-J_2$ must stand at right angles to each other, since obviously the differential vector $J_1-J_2$ must be parallel to the second, short diagonal of the parallelogram constructed from the values $J_1$, $J_2$, and since in an equilateral parallelogram the diagonals stand at right angles to each other. In other words their phase difference is 90°, so that the indication of the wattmeter, whose stationary field is energized by the sum of $J_1+J_2$ and whose movable coil is traversed by the difference $J_1-J_2$ must be equal zero. Likewise the indication of a measuring instrument, in which as is shown in Figure 2 its stationary field is energized in one half by $J_1$ and in the other half by $J_2$ and in which one half of its movable coil is traversed by $J_1$ and the other half by $J_2$ but in the manner described before, must be equal zero if the two current values $J_1$ and $J_2$ are equal.

Figure 1 further clearly indicates that if the currents $J_1$ and $J_2$ are unequal the vectors are shifted such that the two vectors representing $J_1+J_2$ and $J_1-J_2$ do not any more stand at right angles to each other so that consequenly the phase difference ceases to be 90°, in which case as a consequence the wattmeter would give an indication different from zero.

This method for measuring current values may of course be applied in similar manner to the measuring of unknown voltages.

Figure 3 shows a wiring diagram comparing an unknown alternating voltage with a known voltage. The unknown voltage is applied to the terminals 11, 12, whereas the known variable voltage with which it is to be compared is derived at the terminals 4', 4'' of a potentiometer 4. The latter is connected to the terminals 1, 2 at which the total known voltage exists which can be read on the voltmeter 30. The field coils 5 and 15 of the indicating instrument of the wattmeter type which are respectively connected to the two sources of voltage to be compared are connected in circuit in such manner that their combined effects represent the vectorial sum of the two voltages. The movable coil 6 on the other hand, which in this case is not divided into two halves is arranged in circuit such that the vector difference between the two voltages becomes effective. This is attained by connecting corresponding terminals of the two terminal pairs 1, 2 and 11, 12, for instance terminals 12 and 2, by means of conductor 17 with each other by way of terminal 4' of the adjustable resistance and by connecting the coil 6 between the other pair 11 and 1 of the terminals by way of point 4". The indicator hand of the instrument is brought to zero by shifting the potentiometer contact 4". If the indicator is in zero position the voltage between terminals 11 and 12 is equal to that which exists between points 4' and 4". The voltage which exists between these two last mentioned points can be read off on the calibrated graduation in the same manner as is customary in potentiometers.

Also according to this arrangement; the same as in the arrangement for comparing two currents, it is immaterial which of the two vector values is called positive and which is called negative. If the designation is chosen so that the total effect of coils 5 and 15 in Figure 3, i. e. the intensity of the field generated does not correspond with the effect of the vectorial sum of the voltage but with the vectorial difference, then in the diagram shown in Figure 3 the current which traverses the movable coil 6 represents the vectorial sum of the voltages. In other words the effect does in no way depend upon the designation of the direction of the currents such as $J_1$ and $J_2$ in the vector diagram Figure 1.

Figure 4 illustrates the invention applied to comparing resistances by means of alternating currents. In the particular example illustrated it is desired to determine the resistance encountered by the current flowing in the ground from a ground plate 28 in different directions. For instance it is desired to ascertain the resistance of the path between this plate 28 and a test rod 10 driven into the ground. The current which flows from plate 28 to test rod 10 is furnished by an alternating current source for instance by an inductor 20 and flows by way of the primary winding 22 of a transformer to the ground plate 28 then past test rod 10 to an auxiliary ground 27 and then back to the source 20. The secondary winding 25 of this transformer supplies a secondary circuit with current which includes a graduated calibrated resistance 21 on which a sliding contact 26 runs and this circuit further contains one of the stationary coils of a measuring instrument 9 of the type described before. The other stationary coil of this instrument is included in the return circuit from auxiliary ground 27 to the current source 20 previously mentioned.

The currents flowing in the two circuits are designated with $J_1$ and $J_2$ like in the other modifications. The currents may be equal to each other or may have a certain relation to each other depending upon the ratio of the transformer. In the present example they are for simplicity sake assumed to be equal. In this case as well as in case the currents have a different ratio, the operation of the arrangement is the same. The direction of the current $J_1$ between the plate 28 and test rod 10 and that of current $J_2$ between the points 8 and 26 of resistance 21 remains essentially the same. Through the phase error introduced by the transformer a slight shifting in phase between the two currents is caused.

If now currents $J_1$ and $J_2$ are assumed to be not only equal but of the same phase, the voltage between points 26 and 10 is equal to 0 since the resistance portion of resistance 21 located between points 26 and 8 is equal to the resistance between plate 28 and test rod 10. Therefore if under those conditions a movable coil is placed between points 10 and 26, it will register zero. Then the value read on the graduation of resistance 21 will give the value of the unknown resistance between plate 28 and rod 10. Similar contemplation would prevail also in case the ratio of the transformer 22, 25 is different.

However, a great disadvantage of methods of this kind operating with alternating current is due to the phase error introduced by the transformer on account of which the currents $J_1$ and $J_2$ can never be exactly in phase. As a consequence the voltage between points 26 and 10, i. e., the difference of the potential drops between points 26 and 8 and points 10 and 28 cannot become zero and therefore indicating instruments ordinarily used for directly responding to these currents, such as telephones or vibration galvanometers will never indicate zero.

In order to remedy these defects according to the present invention and as may be seen from Figure 4, I use a wattmeter as an indicating instrument whose movable coil $9^a$ corresponding to coil 6 in Figures 2 and 3 is connected to points at which a voltage exists equal to the difference between the voltages existing at points 8 and 26 and 28 and 10. In other words the movable coil is connected between the sliding contact 26 and test rod 10. The stationary field of this wattmeter is determined by the vector sum of the two voltages 8—26 and 28—10 and in order to bring about this effect and in accordance with the arrangement shown in Figures 2 and 3, the field consists of two coils 9 each of which is traversed by one of the currents $J_1$ and $J_2$ as explained hereinbefore. Since the ground resistance between plate 28 and test rod 10 and the resistance 21 both may be considered as non-inductive resistances, the currents $J_1$ and $J_2$ will be in phase with the pertaining voltage drops.

For instance if the known adjustable resistance 21 is adjusted so that it agrees with the unknown resistance between plate 28 and rod 10, the pertaining voltage drops between points 8 and 26, respectively 28 and 10, are also equal. Since in that case also the currents $J_1$ and $J_2$ would be equal and since each of these currents is in phase with its pertaining voltage drop, the vector sum of the currents must agree in phase with the vector sum of the voltages. Now in order to have the measuring instrument indicate zero, only the phase of the resulting values in the fixed and movable coils of the instrument is of importance, i. e. values which are composed of equal or oppositely directed individual values such as for instance $J_1$ and $J_2$. Therefore instead of making for instance the field of the instrument dependent upon the vectorial sum of the voltages it may be made dependent upon the vectorial sum of the currents as will for instance be noted from Figure 4. In this case of the two horizontally placed field coils 9 the upper coil is transferred by current $J_2$ and the lower one by current $J_1$ both in the same direction. As may be noted from the previous explanation, in case resistances 8—26 and 28—10 are equal the instrument will register zero. From this it appears that in case the instrument does register zero the unknown resistance 28—10 is equal to the adjusted known resistance 8—26.

I claim:—

1. A zero measuring method for the characteristics of an alternating current circuit in which a known controllable characteristic is adjusted to the magnitude of a similar characteristic to be measured, consisting in influencing the stationary field portion and the movable field portion of an indicator of the wattmeter type in like manner by currents due to the known controllable characteristic and due to the characteristic to be measured, irrespective of the phase relation of the two characteristics, the known characteristic being adjusted until a zero reading is obtained on the indicator.

2. A zero measuring method for the characteristics of an alternating current circuit in which a known controllable characteristic is adjusted to the magnitude of a similar characteristic to be measured, consisting in influencing the stationary field portion and the movable field portion of an indicator of the wattmeter type in like manner by currents due to the known controllable characteristic and due to the characteristic to be measured, irrespective of the phase relation of the two characteristics, the known characteristic being adjusted until a zero reading is obtained on the indicator, the two characteristics to be compared assisting each other in one portion of said indicator and opposing each other in the other portion.

3. In measuring circuits for measuring alternating current values by adjusting a known measured value to an unknown value of the same character in combination a regulating resistance, means for measuring the known value and an indicator of the wattmeter type having fixed field coils and a movable coil, and circuit connections for affecting the ampere turns of both sets of coils by the currents resulting from the known and the unknown value.

4. In measuring circuits for measuring alternating current values by adjusting a known measured value to an unknown value of the same character in combination a regulating resistance, means for measuring the known value and an indicator of the wattmeter type having fixed field coils and a movable coil, and circuit connections for affecting the ampere turns of one set of coils by the sum of the currents resulting from the known and unknown values and for affecting the ampere turns of the other set by the difference of the current resulting from said values.

In testimony whereof I affix my signature.

DIETER ALBRECHT.